United States Patent [19]
Harned et al.

[11] 3,715,145
[45] Feb. 6, 1973

[54] HYDRAULIC ANTI-LOCK BRAKE CONTROL SYSTEM

[75] Inventors: John L. Harned, Grosse Pointe Woods; Edwin E. Stewart, Warren, both of Mich.

[73] Assignee: General Motors Corporation, Detroit, Mich.

[22] Filed: Sept. 30, 1971

[21] Appl. No.: 185,304

[52] U.S. Cl. .............................. 303/21 F, 188/181 A
[51] Int. Cl. ................................................. B60t 8/12
[58] Field of Search ...... 303/21 F, 21 CF; 188/181 A, 188/181 C

[56] References Cited

UNITED STATES PATENTS

| | | |
|---|---|---|
| 3,667,811 | 6/1972 | Okamoto et al. ..................... 303/21 F |
| 3,669,403 | 6/1972 | Slavin and Carp .................. 303/21 F |
| 3,671,084 | 6/1972 | Woodward .......................... 303/21 F |
| 3,671,085 | 6/1972 | Pasek et al. ........................ 303/21 F |

*Primary Examiner*—Allen N. Knowles
*Assistant Examiner*—Gene A. Church
*Attorney*—W. E. Finken et al.

[57] ABSTRACT

The invention utilizes a wheel speed proportional pressure generated by a transmission governor and a vehicle ground speed pressure provided by a vehicle ground speed computer and provides a hydraulic anti-lock brake system including a fluid pressure operated wheel brake, an operator actuated master cylinder, a low speed cutout valve which communicates the master cylinder pressure directly to the wheel brake at vehicle speeds below some predetermined level, a control valve which modulates the governor pressure to provide a control pressure proportional to the amount by which master cylinder pressure exceeds the brake pressure and a clutch modulator which acts at vehicle speeds above the threshold of the low speed cutout valve to provide a brake pressure proportional to the control pressure. The transmission governor is modified to receive the vehicle ground speed pressure and apply a force proportional thereto to the governor valve spool so that during wheel slip the governor pressure is a function of both wheel speed and ground speed, or, in other words, a function of the magnitude of wheel slip.

3 Claims, 2 Drawing Figures

HYDRAULIC ANTI-LOCK BRAKE CONTROL SYSTEM

CROSS REFERENCE TO RELATED APPLICATIONS

The hydraulic anti-lock brake control system of this invention is used in conjunction with the hydraulic vehicle ground speed computer claimed in copending patent application Ser. No. 185,086, (Docket No. A-15,498), assigned to the common assignee. The vehicle ground speed computer provides a pressure which is proportional to the vehicle linear speed relative to the ground.

BACKGROUND OF THE INVENTION

The invention relates to an anti-lock brake control system and more particularly to an all hydraulic wheel slip control system which prevents wheel lockup by modulating the brake pressure to provide nearly constant wheel slip.

It is well known that the lateral friction coefficient between a vehicle tire and the road surface decreases rapidly when the brake torque generated by an excessive brake pedal actuation causes the vehicle wheel to depart from the free rolling condition and approach the locked wheel condition. The decrease in lateral friction coefficient as excessive braking causes an increase in wheel slip is commonly evidenced by impaired vehicle directional stability. It is, therefore, desirable to limit the decrease in lateral friction coefficient by controlling the brake pressure so as to maintain the wheel slip at some acceptable value. The present invention operates on the slip control principle, continuously varying wheel speed so as to maintain a preselected fixed ratio between the vehicle ground speed and the wheel speed. The present invention provides wheel slip control through proportional modulation of the brake pressure as compared to the more common on-off, or binary control.

BRIEF SUMMARY OF THE INVENTION

The invention utilizes a wheel speed proportional pressure generated by a transmission governor and a vehicle ground speed pressure provided by a vehicle ground speed computer. The transmission governor is modified to include a piston acted upon by the vehicle ground speed pressure and engaging the governor valve spool so that the governor pressure is a function of both wheel speed and vehicle ground speed when excessive braking results in wheel speed falling below the vehicle ground speed. The brake control system includes a fluid pressure operated wheel brake, an operator actuated master cylinder, and a low speed cutout valve which is responsive to the level of the vehicle ground speed pressure and communicates master cylinder pressure directly to the wheel brake at vehicle speeds below a certain predetermined level. A control valve receives master cylinder and wheel brake pressures as opposed acting input signals and modulates the governor pressure to provide a control pressure proportional to the difference between the master cylinder pressure and the brake pressure. A clutch modulator acts on the fluid communicating with the wheel brake to provide a brake pressure proportional to the control pressure. When wheel slip results in a governor pressure which is no longer capable of providing the control pressure being called for by the difference between master cylinder and brake pressures, the control valve provides a control pressure equal to the governor pressure causing the clutch modulator to vary the brake pressure in response to the wheel slip condition so as to provide a nearly constant wheel slip. A check valve is provided to prevent the brake pressure from ever exceeding the master cylinder pressure.

DESCRIPTION OF THE DRAWINGS

The objects and features of the invention will be apparent upon consideration of the following specification and drawings in which:

FIG. 1b illustrates the anti-lock brake control system having parts broken away and in section.

THE WHEEL CONDITION SENSING SYSTEM

The Governor

Figure 1A:
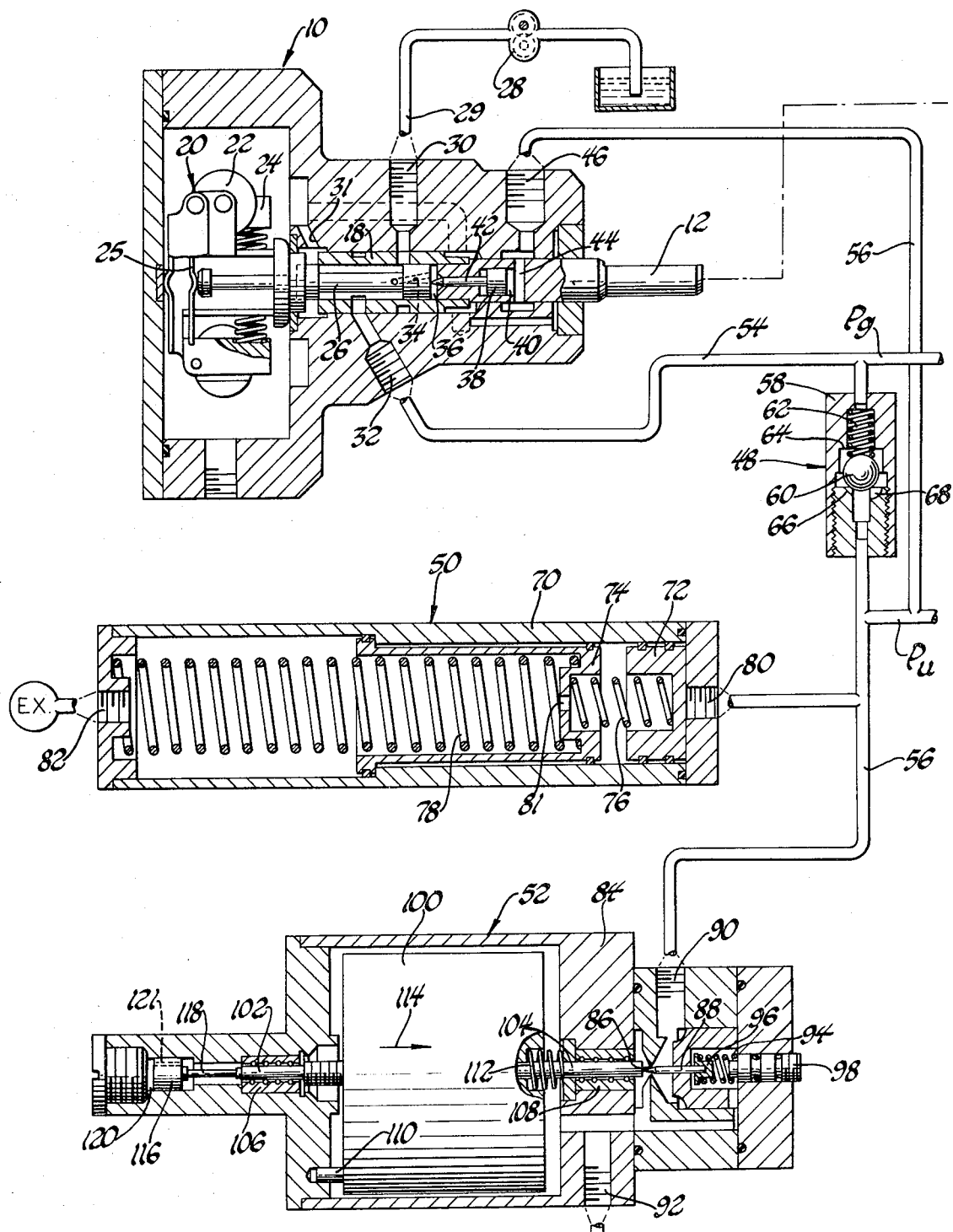
FIG. 1a illustrates the modified transmission governor and the hydraulic vehicle ground speed computer having parts broken away and in section.
Figure 16:
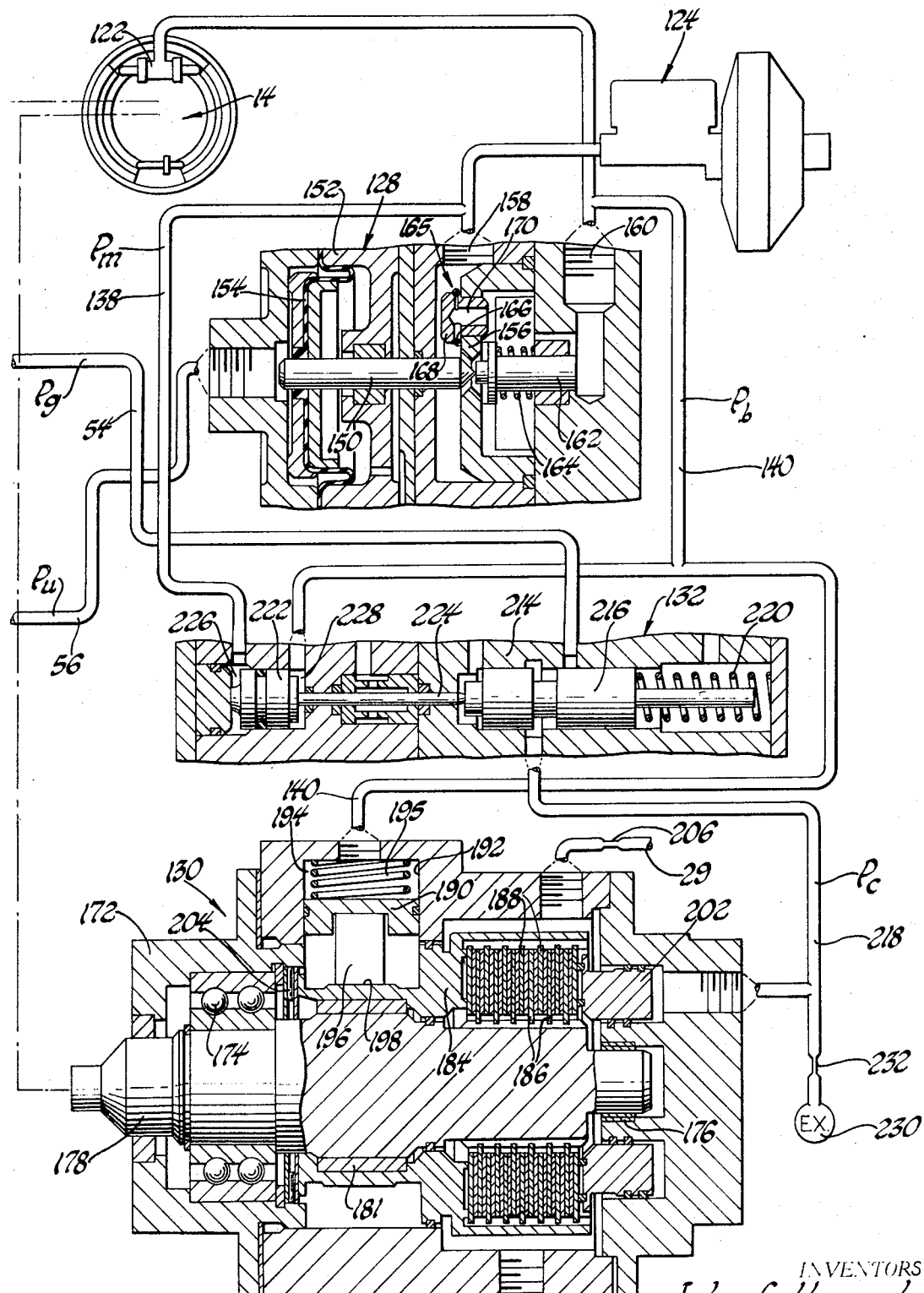

Referring to FIG. 1a, a modified transmission governor 10 includes an input shaft 12 which is connected through the transmission output shaft and differential to the rear wheels, one of which is indicated at 14, so as to be driven at the average rear wheel speed. The input shaft 12 is attached to a sleeve 18 which is in turn connected to a flyball assembly indicated generally at 20. Flyball assembly 20 includes a primary weight 22 and a secondary weight 24 which acts through a lever 25 to provide a rightward acting force on a valve spool 26 which is proportional to the square of the velocity of the rotating weights. The spool 26 responds to this force by opening fluid communication between the governor outlet port 32 and the transmission line pressure generated by pump 28 and communicated through conduit 29 to the governor supply port 30. The governor outlet pressure at port 32, hereinafter referred to as $P_g$ is communicated through an orifice 34 in spool 26 to a chamber 36 at the rightward end of spool 26. $P_g$ rises until the pressure in chamber 36 exerts a force on the rightward end of the spool 26 equal to the centrifugal force resultant acting on the leftward end of valve spool 26. When the wheel speed subsequently decreases and the flyball generated force decreases, the spool 26 acts as a regulating valve since $P_g$ within the chamber 36 moves valve spool 26 leftwardly opening fluid communication between the output port 32 and an exhaust port 31. Thus, the governor continually responds to keep the spool 26 in equilibrium, producing a $P_g$ proportional to the square of the governor's angular speed.

The primary weights 22 and secondary weights 24 function to provide a two stage pressure versus speed characteristic. Initially, the primary and secondary weights operate as a single weight and then as the wheel speed increases the primary weights become grounded and with any additional speed the force acting on spool 26 is increased only under the influence of the secondary weights 24.

The transmission governor 10 is modified to include a piston 38 which is slidable in input shaft 12 forming a chamber 40 therewith. An extension 42 of piston 38 extends into engagement with the end of spool 26 in chamber 36. A radially extending passage 44 in input shaft 12 communicates chamber 40 to an inlet port 46. The purpose of this modification will be discussed hereinafter.

THE GROUND SPEED COMPUTER

The vehicle ground speed computer includes check valve 48, an accumulator 50, and a decelerometer actuated valve 52. Conduit 54 communicates $P_g$ to the check valve 48 and conduit 56 connects the check valve 48 with the accumulator 50 and the decelerometer actuated valve 52. Check valve 48 includes a housing 58 in which a ball valve 60 is located. A spring 62 seated at housing 58 engages a ball valve 60 urging it away from a seat 64 and into engagement with abutment 66. Fluid passage 68 communicates fluid past ball 60 when it is seated at abutment 66 so that conduits 54 and 56 are connected. When the speed of wheel 14 decreases and consequently $P_g$ decreases, the resulting flow from conduit 56 to conduit 54 will overcome spring 62 and seat ball 60 at valve seat 64. Spring 62 is sized to be compressed when the flow rate indicates a certain predetermined rate of wheel deceleration, for example, 32.2 feet per second squared or 1g.

Accumulator 50 includes a housing 70 in which pistons 72 and 74 are movable. Variable rate springs 76 and 78, of helical variable pitch design, act respectively between pistons 72 and 74 and between piston 74 and housing 70. Springs 76 and 78 function to provide a two-stage construction which produces a nonlinear relationship between the position of piston 72 and the accumulator pressure so that a pressure versus speed curve equivalent to that of the governor 10 is generated. The variable rate spring 78 is preloaded and variable rate spring 76 is at its free length when the respective pistons are positioned as shown in FIG. 1a. The communication of $P_g$ to inlet port 80 of accumulator 50 moves piston 72 leftwardly compressing variable rate spring 76 until piston 72 engages piston 74. A further increase in $P_g$ urges pistons 72 and 74 unitarily leftward compressing the variable rate spring 78. Any fluid leakage past the seals of piston 72 is exhausted through hole 81 of piston 74 and exhaust port 82.

The decelerometer actuated valve 52 functions to exhaust pressure from accumulator 50 at a controlled rate which is proportional to the vehicle linear deceleration. A housing 84 forms a sharp edged hole 86 which in cooperation with a tapered needle 88 produces a flow restriction between an exhaust port 92 and a valve inlet port 90 which is connected to conduit 56. Tapered needle 88 is urged in the flow restricting direction relative the sharp edged hole 86 by a spring 94 which engages the tapered needle 88 through the intermediary of cap 96. The preload of spring 94 is adjustable by virtue of its being seated on a pin 98 which threadedly engages housing 84. A sensor mass 100 includes pins 102 and 104 which are respectively supported on ball bushings 106 and 108. A pin 110 attached to sensor weight 100 engages a hole in housing 84 to prevent rotation of the sensor mass 100. The pins 102 and 104 are aligned with the vehicle longitudinal axis and the ball bushings 106 and 108 allow the sensor mass to move in this single degree of freedom. The end of pin 104 engages the tapered end of tapered needle 88 so that movement of sensor mass 100 adjusts the position of tapered needle 88 and thus the flow through the sharp edged hole 86.

A spring 112 acting between housing 84 and sensor mass 100 resists movement of sensor mass 100 in the direction of arrow 114 which indicates the direction of forward vehicle movement. A piston 116 having an orifice 121 therethrough is attached to pin 102 by a rod 118 and operates in a closed chamber 120 to provide damping of sensor mass 100 which prevents undesired oscillations. The flow area between tapered needle 88 and the walls of sharp edged hole 86 varies nearly linearly with the vehicle linear deceleration force acting upon sensor mass 100.

In operation, the pressure in the accumulator 50, hereinafter referred to as $P_u$, is equal to $P_g$ when the vehicle wheels are either decelerating at normal rates or accelerating. When the pressure difference across check valve 48 is indicative of a wheel deceleration in excess of 1g or some other predetermined level, conduit 56 is isolated from conduit 54 by the closing of check valve 48. The pressure in accumulator 50 $P_u$ is exhausted at a controlled rate proportional to the vehicle linear deceleration through the decelerometer actuated valve 52. The springs 76 and 78 of accumulator 50 function to provide a two stage characteristic equivalent to that of the transmission governor 10. Thus, the cooperation of check valve 48, accumulator 50, and the decelerometer actuated valve 52 provide a pressure $P_u$ in conduit 56 which is proportional to the vehicle speed relative the ground, irrespective of the magnitude of wheel slip.

Feedback of wheel speed pressure, $P_u$, to the chamber 40 of the modified transmission governor 10 provides a governor pressure, $P_g$, that is a function of both wheel speed and vehicle ground speed reference pressure $P_u$. As hereinbefore stated, a flyball generated centrifugal force acts rightwardly on spool 26 while the $P_g$ pressure force in chamber 36 acts leftwardly. $P_u$ in conduit 56 is communicated to the chamber 40 through inlet port 46 and radical passage 44 and acts on piston 38 to generate a pressure force which is transmitted to spool 26 through piston extension 42. Thus $P_g$ is proportional to the difference between the rightward acting centrifugal force resultant and the leftward acting $P_u$ pressure force acting on piston 38. Thus, it can be seen that when the vehicle wheel 14 is either decelerating at normal rates or accelerating, $P_g$ equals $P_u$ so that $P_g$ remains proportional to the wheel speed. When, however, the excessive braking causes check valve 48 to close and wheel speed to fall below vehicle speed, the feedback of $P_u$ to chamber 40 provides a $P_g$ which is a function of both wheel speed and vehicle ground speed, or in other words, a $P_g$ which is indicative of the magnitude of wheel slip.

DESCRIPTION AND OPERATION OF THE BRAKE CONTROL CIRCUIT

In general, the anti-lock brake control circuit of FIG. 1b includes a wheel brake 122 which imparts a braking torque to the wheel 14 in proportion to the brake fluid pressure, hereinafter referred to as $P_b$ communicated thereto; an operator actuated power-boosted master cylinder 124 which generates a master cylinder pressure hereinafter referred to as $P_m$; a low-speed cutout valve 128 which communicates $P_m$ directly to the wheel brake 122 only at vehicle speed below some predetermined level; a control valve 132 which modulates $P_g$ to provide a control pressure, hereinafter referred to as $P_c$ which is proportional to the amount by which $P_m$ exceeds $P_b$; a clutch modulator 130 which at speeds above the speed threshold of low speed cutout valve 128 provides a $P_b$ proportional to $P_c$.

THE LOW SPEED CUTOUT VALVE

The low speed cutout valve 128 provides a direct fluid path between the master cylinder 124 and wheel brake 122 whenever the vehicle speed is below a predetermined level. The low speed cutout valve 128 includes a tapered plunger 150 which is slidable in housing 152 and attached to a diaphragm 154. A valve seat 156 formed in housing 152 connects fluid passages 158 and 160 which are respectively connected to $P_m$ conduit 138 and $P_b$ conduit 140. A hydraulically balanced piston 162 is slidable in housing 152 and is biased by a spring 164 into engagement with the tapered end of plunger 150. Spring 164 acts through piston 162 to hold the plunger 150 unseated relative to the valve seat 156 until $P_u$ which is communicated to diaphragm 154 by conduit 56 increases sufficiently to provide a pressure force on plunger 150 which exceeds the spring force of spring 164. Thus, the low speed cutout valve 128 functions to provide a $P_b$ equal to $P_m$ until the vehicle reaches a predetermined speed threshold during acceleration and then again provides a $P_b$ equal to $P_m$ during vehicle deceleration when the vehicle ground speed has been reduced below the speed threshold of the valve. The low speed cutout valve 128 also includes a check valve 165 which consists of an O-ring 166 seated in a groove on plug 168 situated in the wall of housing 152 between $P_m$ passage 158 and $P_b$ passage 160. A passageway 170 in plug 168 is closed by an O-ring 166 when $P_m$ exceeds $P_b$ and is opened when a $P_b$ is excess of $P_m$ lifts the O-ring 166 from the plug 168. Thus, the check valve 165 prevents $P_b$ from exceeding the level of braking being called for by $P_m$.

THE CLUTCH MODULATOR

Whenever the low-speed cutout valve 128 is closed, the magnitude of $P_b$ is determined by the clutch modulator 130. The clutch modulator 130 includes a housing 172 in which bearings 174 and 176 rotatably support a shaft 178. Shaft 178 is connected to wheel 14 and rotates therewith. A bearing 181 rotatably mounts an annular shaft 184 on shaft 178. A plurality of driving clutch plates 186 are connected to shaft 178 and a plurality of driven clutch plates 188 are connected to the driven annular shaft 184. A piston 190 is slidable in a bore 192 which extends transversely of the axis of shafts 178 and 184. The piston 190 forms with housing 172 a chamber 194 which communicates with $P_b$ conduit 140. A cam follower 196 extends between piston 190 and a cam surface 198 formed on the outer periphery of the annular shaft. A spring 195 acts between housing 172 and piston 190 and is preloaded sufficiently to maintain contact between piston 190, cam follower 196, and cam surface 198 when the magnitude of $P_b$ acting on piston 190 is insufficient to do so. It can be seen that the magnitude of $P_b$ in conduit 140 will be determined by the rotary position of the annular shaft 184 and the cam surface 198 formed thereon.

The rotary position of annular shaft 184 is determined by the magnitude of a control pressure $P_c$ which acts on an annular piston 202 which is slidable in housing 172. The annular piston 202 abuts a driven clutch plate 188 and compresses the clutch pack in proportion to the pressure $P_c$ acting thereon. A thrust bearing 204 supports annular shaft 184 against the $P_c$ pressure force on annular piston 202. The $P_c$ pressure force acting on annular piston 202 generates friction forces between the driving clutch plates 186 and the driven clutch plates 188 to produce a drive torque on annular shaft 184 which acts to rotate the cam surface 24. This drive torque is opposed by a reaction force generated by the combined force of spring 195 and the $P_b$ pressure in chamber 194 which is transmitted through piston 190 and cam follower 196 to the cam surface 198.

Fluid from transmission pump 28 is received through a conduit 29 and an orifice 206 and circulates through housing 172 to cool the clutch plates 186 and 188. It can be seen that the ratio of $P_b$ to $P_c$ will be determined by clutch modulator 130 design parameters, for example, the area of annular piston 202, dimensions and numbers of clutch plates, rise angle and radius of the cam surface 198, and end area of piston 190.

THE CONTROL VALVE

The control valve 132 includes a housing 214 in which a spool valve 216 is slidable to selectively block or permit communication of $P_g$ in conduit 54 to $P_c$ conduit 218. A spring 220 urges spool 216 to block communication of $P_g$ to $P_c$ conduit 218. A piston 222 is also slidable in housing 214 and includes an extension 224 which extends sealingly through housing 214 into engagement with the end of spool 216 opposite spring 220. $P_b$ conduit 140 communicates $P_b$ to chamber 228 formed on the side of piston 222 having the extension 224 and $P_m$ is communicated through conduit 138 to a chamber 226 formed on the other side of piston 192. With $P_m$ at zero, the spring 220 forces spool 216 to the left as limited by the engagement of piston 222 with housing 214. In this position, $P_g$ is blocked and so $P_c$ in conduit 218 equals zero due to its communication to exhaust port 230 through orifice 232. When the operator actuates master cylinder 124, $P_m$ increases from zero generating a pressure force urging piston 222 and spool 216 to the right. When the preload of spring 220 is exceeded, $P_g$ is communicated to the $P_c$ conduit 218. The resulting $P_c$ in conduit 218 acts on annular piston 202 of clutch modulator 130 to generate a proportional brake pressure $P_b$ as hereinbefore described. The resulting $P_b$ in turn acts on the leftward end of piston 222 and in opposition to the $P_m$ acting on the rightward end thereof. This feedback of $P_b$ to control valve 132 causes spool 186 to modulate the input $P_g$ so that the output $P_c$ is proportional to the amount by which $P_m$ exceeds $P_b$.

OPERATION

During normal vehicle braking by the driver at vehicle wheel speeds above this threshold of low speed cutout valve 128, the brake control circuit functions to maintain a one-to-one relationship between $P_m$ and $P_b$. The control valve 132 functions to provide a $P_c$ which will generate a $P_b$ equal to $P_m$.

When the driver applies excessive pedal effort and the resulting $P_m$ calls for a $P_b$ which produces a brake torque that the tire-to-road friction cannot support, the wheel deceleration exceeds the vehicle deceleration, causing a rapid wheel speed decrease and consequent increase in wheel slip. The reduced wheel speed drives the modified transmission governor 10 at a reduced speed and thus $P_g$ decreases with the wheel speed. Check valve 48 closes in response to the rapidly decreasing $P_g$ and decelerometer actuated valve 52 exhausts the accumulated pressure to produce a vehicle ground speed reference pressure $P_u$ as hereinbefore described. The feedback of $P_u$ to the modified transmission governor 10 produces a governor pressure $P_g$ that is a function of both wheel speed and vehicle ground speed reference pressure $P_u$, or in other words, proportional to the magnitude of wheel slip. When $P_g$ falls to such an extent that it is no longer capable of producing the value of $P_c$ being called for by $P_m$, $P_m$ moves piston 222 and the spool 216 to the extreme rightward position causing $P_c$ to equal $P_g$. As $P_g$ and thus $P_c$ decrease, with the wheel speed, the clutch modulator 130 decreases $P_b$.

The wheel speed is made to decrease in step with the vehicle ground speed so as to provide an approximately constant wheel slip control characteristic. Slip control is achieved by the feedback of $P_u$ to governor 10. As wheel speed decreases due to the excessive wheel deceleration, $P_g$ decreases and would become zero when the centrifugal force resultant acting on spool 26 equals the $P_u$ pressure force on piston 38. If $P_g$ were to equal zero, $P_c$ would also equal zero and tire torque would act to accelerate the wheel 14. Thus, it can be seen that at some wheel speed below vehicle ground speed an equilibrium point exists. By suitably selecting the end areas of spool 26 and piston 38, a wheel slip control characteristic can be achieved that will maintain wheel slip nearly constant and at a predetermined magnitude. Since $P_u$ decreases in synchronism with the decrease in vehicle ground speed, it can be seen that the speed of the controlled wheel 14 will decrease in synchronism with $P_u$ and at the constant wheel slip determined by the end areas of spool 26 and piston 38.

When the vehicle ground speed pressure $P_u$ acting on diaphragm 154 of low speed cutout valve 128 decreases to such an extent that the spring force of spring 164 exceeds the opposing pressure force, spring 164 moves the tapered plunger 150 away from the valve seat 156 so that $P_m$ is communicated directly to the wheel brake 14, thus assuring that vehicle braking is maintained whenever the low speed renders the hydraulic anti-lock system incapable of generating sufficient brake pressure.

It is noted that under some conditions the possibility exists where $P_b$ exceeds $P_m$. This can occur, for example, if the driver accelerates the vehicle through the threshold speed setting of low speed cutout valve 128 with his foot on the brake pedal producing some value of $P_b$. When low speed cutout valve 128 closes, this value of $P_b$ could remain trapped in wheel brake 122 even though the vehicle driver removes all pedal effort. If this condition occurs, $P_b$ in passageway 170 of the check valve 165 lifts O-ring 166 from the plug 168 and $P_b$ is reduced to the level of $P_m$.

What is claimed is:

1. A vehicle brake control system effective to vary a wheel speed during high level braking to provide a substantially constant ratio of vehicle ground speed to wheel speed and comprising:

a master cylinder actuated by the vehicle operator and generating a fluid pressure;
   a fluid pressure operated wheel brake adapted to provide a braking torque in proportion to the brake pressure acting thereon;
   a vehicle ground speed computer providing a fluid pressure proportional to the vehicle ground speed;
   governor means providing a governor pressure as a function of both wheel speed and vehicle ground speed pressure;
   control valve means acting to modulate the governor pressure to provide a control pressure which is proportional difference between master cylinder pressure and brake pressure;
   and actuator means including piston means in brake fluid communication with the wheel brake and providing a brake pressure proportional to the control pressure.

2. A vehicle brake control system effective to vary a wheel speed during high level braking to provide a substantially constant ratio of vehicle ground speed to wheel speed and comprising:

a master cylinder actuated by the vehicle operator and generating a fluid pressure;
   a fluid pressure operated wheel brake adapted to provide a braking torque in proportion to the brake pressure acting thereon;
   a vehicle ground speed computer providing a fluid pressure proportional to the vehicle ground speed;
   governor means providing a governor pressure proportional to wheel speed and vehicle ground speed pressure and including a valve spool having a wheel speed driven flyball generated force acting on one end thereof and governor pressure and vehicle ground speed pressure acting on the other end thereof;
   control valve means acting to modulate the governor pressure to provide a control pressure which is proportional to the difference between master cylinder pressure and brake pressure;
   and a clutch modulator including a piston sealingly slidable in a bore to pressurize brake fluid in communication with the wheel brake, rotary cam means operatively connected to the piston and determining the position thereof within the bore, a driven power shaft, a clutch device including driving plate means carried on the power shaft and driven plate means carried on the rotary cam means, and piston means engaging the clutch device and acted upon by control pressure to impart rotary torque to the cam means whereby a brake pressure proportional to control pressure is provided.

3. A vehicle brake control system effective to vary a wheel speed during high level braking to provide a substantially constant ratio of vehicle ground speed to wheel speed and comprising:

a master cylinder actuated by the vehicle operator and generating a fluid pressure;
   a fluid pressure operated wheel brake adapted to provide a braking torque in proportion to the brake pressure acting thereon;
   a vehicle ground speed computer providing a fluid pressure proportional to the vehicle ground speed;
   governor means providing a governor pressure proportional to wheel speed and vehicle ground speed pressure and including a valve spool having a wheel speed driven flyball generated force acting on one end thereof and governor pressure and vehicle ground speed pressure acting on the other end thereof;

control valve means acting to modulate the governor pressure to provide a control pressure which is proportional to the difference between master cylinder pressure and brake pressure;

actuator means including piston means in brake fluid communication with wheel brake and providing a brake pressure proportional to the control pressure;

valve means normally communicating master cylinder pressure to the wheel brake and responsive to vehicle ground speed pressure to block fluid communication between the master cylinder and the wheel brake at vehicle speeds above a predetermined level;

and check valve means connected fluidly intermediate the master cylinder and the wheel brake preventing the brake pressure from exceeding the master cylinder pressure.

* * * * *